(12) United States Patent
Sakurai et al.

(10) Patent No.: US 6,858,701 B2
(45) Date of Patent: Feb. 22, 2005

(54) WHOLLY AROMATIC POLYESTER CARBONATE AND PROCESS THEREFOR

(75) Inventors: Hiroshi Sakurai, Iwakuni (JP);
Toyoaki Ishiwata, Iwakuni (JP);
Takanori Miyoshi, Iwakuni (JP);
Shunichi Matsumura, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/297,082

(22) PCT Filed: May 31, 2001

(86) PCT No.: PCT/JP01/04611

§ 371 (c)(1),
(2), (4) Date: Dec. 2, 2002

(87) PCT Pub. No.: WO01/92370

PCT Pub. Date: Dec. 6, 2001

(65) Prior Publication Data

US 2003/0181627 A1 Sep. 25, 2003

(30) Foreign Application Priority Data

Jun. 1, 2000 (JP) ........................................ 2000-164532

(51) Int. Cl.[7] .............................................. C08G 63/00
(52) U.S. Cl. .................... 528/272; 264/176.1; 264/219; 528/271; 528/273; 528/279; 528/280; 528/281; 528/282; 528/283
(58) Field of Search .......................... 264/219; 528/271, 528/272, 279, 280, 281, 282, 283

(56) References Cited

U.S. PATENT DOCUMENTS 6,608,165 B2 * 8/2003 Funakoshi et al. .......... 528/196

FOREIGN PATENT DOCUMENTS

| EP | 1 293 537 A1 | 3/2003 |
|---|---|---|
| JP | 1-247420 A | 10/1989 |
| JP | 3-068626 | 3/1991 |
| JP | 06145317 | * 11/1992 |
| JP | 5-262865 | 10/1993 |
| JP | 7-118372 A | 5/1995 |
| JP | 7-133345 A | 5/1995 |
| JP | 7-133345 | 5/1995 |
| JP | 7-233247 A | 9/1995 |
| JP | 8-20639 | 1/1996 |
| JP | 8-73578 | 3/1996 |
| JP | 9-235362 | 9/1997 |
| JP | 9-235363 | 9/1997 |
| JP | 9-235364 | 9/1997 |
| WO | WO 01/98412 A1 | 12/2001 |

* cited by examiner

Primary Examiner—Terressa Boykin
(74) Attorney, Agent, or Firm—Sughrue Mion, PLLC

(57) ABSTRACT

A wholly aromatic polyester carbonate having a good color and excellent heat resistant stability. This polymer had an extremely low alkali metal content of 10 ppm or less. This polymer is advantageously produced by reacting an aromatic dicarboxylic acid, aromatic diol and diaryl carbonate in a specific molar ratio in the presence of a pyridine-based compound as a catalyst.

11 Claims, No Drawings

WHOLLY AROMATIC POLYESTER CARBONATE AND PROCESS THEREFOR

FIELD OF THE INVENTION

The present invention relates to a wholly aromatic polyester carbonate and to a production process therefor. More specifically, it relates to a wholly aromatic polyester carbonate having a good color and excellent heat resistant stability and to a production process therefor.

DESCRIPTION OF THE PRIOR ART

Requirements for engineering plastics having high heat resistance and excellent mechanical strength have been becoming higher and higher. Non-crystalline engineering plastics include wholly aromatic polyester carbonates derived from aromatic diols, aromatic dicarboxylic acids and carbonate precursors. Since aromatic polyester carbonates have excellent heat resistance, transparency and impact resistance, they are used in lenses and light covers. For example, non-crystalline wholly aromatic polyester carbonates which comprise 2,2-bis(4-hydroxyphenyl)propane (to be referred to as "bisphenol A" hereinafter) as an aromatic diol and terephthalic acid or isophthalic acid as an aromatic dicarboxylic acid show higher thermal deformation temperature than polycarbonates which comprise bisphenol A as the main component and excellent transparency and have relatively well-balanced characteristic properties. Therefore, they are used for various application purposes.

There are many known processes for producing these wholly aromatic polyester carbonates. The general process is an interfacial polycondensation process in which phosgene and dicarboxylic acid dichloride are dissolved in an organic solvent such as methylene chloride and the resulting solution is contacted to an alkaline aqueous solution of an aromatic diol. This interfacial polycondensation process can be carried out at a low temperature and makes it easy to obtain a high molecular weight polymer which is little colored. However, a complicated operation is required for the synthesis and purification of phosgene and dicarboxylic acid dichloride as raw materials, thereby boosting production costs. Further, methylene chloride which is generally used as a reaction solvent in this interfacial polycondensation process is a chemical substance which involves environmental and sanitary problems and must be handled very carefully. However, since the boiling point of methylene chloride is very low at 40° C., it is difficult to establish a closed system which enables the complete recycling of methylene chloride used for the production of a wholly aromatic polyester carbonate with the existing equipment, the closed system costs a great deal, and evaporated methylene chloride has a bad influence upon environment and sanitation.

There is also known a melt polycondensation process in which an aromatic diol, carbonic acid diester and aromatic dicarboxylic acid diester are polymerized in a molten state by an ester exchange method. Although this melt polycondensation process is characterized in that no solvent is used and no halogen-based raw material is used basically, a high molecular weight polymer is hardly obtained and the obtained polymer is considerably colored as a reaction is carried out at a high temperature.

As a solution to the above problems of the melt polycondensation process, JP-A 3-68626 (the term "JP-A" as used herein means an "unexamined published Japanese patent application") discloses a process for producing a polyester carbonate by melt polycondensing an aromatic diol, carbonic acid diester and aromatic dicarboxylic acid or derivative thereof in the presence of a catalyst selected from electron donor amine compounds. JP-A5-262865 discloses a process for producing a wholly aromatic polyester carbonate by an ester exchange reaction between an aromatic diol and a carbonic acid diester in the presence of an aromatic dicarboxylic acid diester, wherein the ester exchange reaction is carried out in the presence of a specific nitrogen compound as a catalyst and a phosphonite-based compound and a hindered phenol-based compound are added when the degree of polymerization rises in the latter stage of a polycondensation reaction. In these processes, an aromatic dicarboxylic acid diaryl ester is used at the start of melt polycondensation. However, as the aromatic dicarboxylic acid diaryl ester is generally synthesized using an alkali metal compound as a catalyst, it is extremely difficult to remove the alkali metal compound completely and this synthesis costs a great deal.

JP-A 8-73578, JP-A 9-235362, JP-A 9-235363 and JP-A 9-235364 report processes for producing a wholly aromatic polyester carbonate by reacting an aromatic dicarboxylic acid diester and a polycarbonate and/or a dicarbonate of an aromatic diol under various conditions. In these processes, a metal compound used as an ester exchange catalyst remains in the obtained polymer and deteriorates the heat resistant stability of the obtained polymer.

As means of solving the above problems is there a process for reacting an aromatic dicarboxylic acid, aromatic diol and diaryl carbonate. However, since the aromatic dicarboxylic acid generally has low solubility and the dissolution of a dicarboxylic acid component determines the rate, an unreacted dicarboxylic acid component is apt to remain in the wholly aromatic polyester carbonate, thereby reducing heat resistant stability.

SUMMARY OF THE INVENTION

It is an object of the present invention to provide a wholly aromatic polyester carbonate having excellent heat resistant stability.

It is another object of the present invention to provide a wholly aromatic polyester carbonate having a good color and a yellow index (YI value) of 20 or less.

It is still another object of the present invention to provide a wholly aromatic polyester carbonate which contains a small number of gelled products and can provide a molded article having high heat resistance.

It is a further object of the present invention to provide an industrially advantageous process for producing the above wholly aromatic polyester carbonate of the present invention.

Other objects and advantages of the present invention will become apparent from the following description.

According to the present invention, firstly, the above objects and advantages of the present invention are attained by a wholly aromatic polyester carbonate comprising a group represented by the following formula (I):

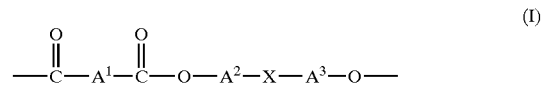

wherein $A^1$ is a substituted or unsubstituted aromatic group, $A^2$ and $A^3$ are the same or different and each a substituted or unsubstituted benzene ring group, and X is a group selected from the group consisting of a group represented by the following formula:

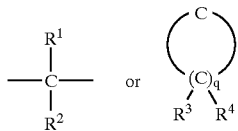

wherein $R^1$, $R^2$, $R^3$ and $R^4$ are each independently a hydrogen atom, halogen atom, alkyl group having 1 to 6 carbon atoms, cycloalkyl group having 5 or 6 carbon atoms, aryl group having 6 to 12 carbon atoms or aralkyl group having 7 to 12 carbon atoms, and q is an integer of 4 to 10, with the proviso that $R^3$'s and $R^4$'s may be the same or different, and a group represented by the following formula:

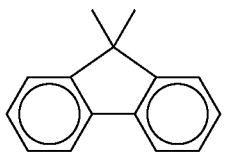

and a group represented by the following formula (II):

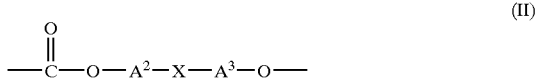
(II)

wherein $A^2$, $A^3$ and X are as defined hereinabove, as the main recurring units, the group represented by above formula (II) contained in an amount of 0.5 to 49 mol % based on the total of the group represented by the above formula (I) and the group represented by above formula (II), and having an alkali metal element content of 10 ppm or less.

According to the present invention, secondly, the above objects and advantages of the present invention are attained by a process for producing a wholly aromatic polyester carbonate, comprising the step of reacting an aromatic dicarboxylic acid represented by the following formula (III):

HOCO-A¹-COOH (III)

wherein $A^1$ is as defined in the above formula (I), and an aromatic diol represented by the following formula (IV):

HO-A²-X-A³-OH (IV)

wherein $A^2$, $A^3$ and X are as defined in the above formula (I), and a diaryl carbonate in a ratio which satisfies the following expressions (1) and (2):

$0.5 \leq A/B < 1.0$ (1)

$0.9 \leq C/(A+B) \leq 1.1$ (2)

wherein A is the number of mols of the aromatic dicarboxylic acid, B is the number of mols of the aromatic diol and C is the number of mols of the diaryl carbonate, in the presence of a compound represented by the following formula (V):

(V)

wherein $R^5$ and $R^6$ are each independently a hydrogen atom, alkyl group having 1 to 6 carbon atoms, cycloalkyl group having 5 to 10 carbon atoms, aryl group having 6 to 12 carbon atoms or aralkyl group having 7 to 12 carbon atoms, or $R^5$ and $R^6$ are bonded together to form a 5- to 7-membered heterocyclic group together with a nitrogen atom bonded thereto, $R^7$ is an alkyl group having 1 to 6 carbon atoms, cycloalkyl group having 5 to 10 carbon atoms, aryl group having 6 to 12 carbon atoms or aralkyl group having 7 to 12 carbon atoms, and n is an integer of 0 to 4, to produce the wholly aromatic polyester carbonate of the present invention.

THE PREFERRED EMBODIMENTS OF THE INVENTION

The wholly aromatic polyester carbonate of the present invention comprises a group represented by the above formula (I) and a group represented by the above formula (II) as the main recurring units.

In the above formula (I), $A^1$ is a substituted or nonsubstituted aromatic group. The nonsubstituted aromatic group is preferably a divalent aromatic group having 6 to 20 carbon atoms. Examples of the nonsubstituted aromatic group include phenylene, naphthylene, diphenyl, diphenyl ether, diphenyl sulfone and diphenyl indane. The substituted aromatic group has at least one substituent substituted for the above nonsubstituted aromatic group. Preferred examples of the substituent include alkyl groups having 1 to 3 carbon atoms such as methyl, ethyl, n-propyl and i-propyl, and halogen atoms such as fluorine and chlorine.

In the formula (I), $A^2$ and $A^3$ are each independently a substituted or nonsubstituted benzene ring group. Examples of the nonsubstituted benzene ring group include 1,2-phenylene, 1,3-phenylene and 1,4-phenylene. The substituted benzene ring group has a substituent exemplified above for the above $A^1$ substituted for the nonsubstituted benzene ring group.

Further, in the formula (I), X is a group represented by the following formula

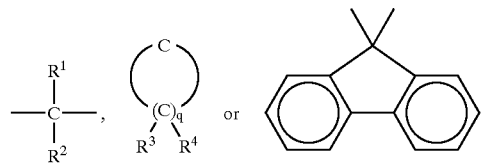

$R^1$, $R^2$, $R^3$ and $R^4$ are each independently a hydrogen atom, halogen atom, alkyl group having 1 to 6 carbon atoms, cycloalkyl group having 5 or 6 carbon atoms, aryl group having 6 to 12 carbon atoms or aralkyl group having 7 to 12 carbon atoms.

Examples of the halogen atom include fluorine and chlorine. Examples of the alkyl group having 1 to 6 carbon atoms include methyl, ethyl, n-propyl, i-propyl, n-butyl and n-hexyl.

Examples of the cycloalkyl group having 5 or 6 carbon atoms include cyclopentyl and cyclohexyl.

Examples of the aryl group having 6 to 12 carbon atoms include phenyl, naphthyl and diphenyl.

Further, examples of the aralkyl group having 7 to 12 carbon atoms include benzyl and phenethyl.

q is an integer of 4 to 10. $R^3$'s and $R^4$'s may be the same or different.

$A^2$, $A^3$ and X in the above formula (II) are as defined in the above formula (I) and can be exemplified by the same groups as described above.

The wholly aromatic polyester carbonate of the present invention comprises the group represented by the above formula (I) and the group represented by the above formula (II) as the main recurring units in a total amount of preferably more than 50 mol %, more preferably more than 70 mol %, much more preferably more than 80 mol %, particularly preferably more than 90 mol % based on the total of the aromatic dicarboxylic acid ester unit and dicarbonate unit constituting the wholly aromatic polyester carbonate.

The group represented by the above formula (II) is contained in an amount of 0.5 to 49 mol %, preferably 2.9 to 31 mol % based on the total of the group represented by the above formula (I) and the group represented by the above formula (II).

Further, the wholly aromatic polyester carbonate of the present invention preferably has a terminal hydroxyl group, terminal carboxyl group and terminal aryl group and the amount of the terminal hydroxyl group is 90 mol % or less, preferably 85 mol % or less based on the total of the three terminal groups.

The alkali metal content of the wholly aromatic polyester carbonate of the present invention is 10 ppm or less. When the alkali metal content is larger than 10 ppm, the decomposition of the polymer is promoted in the long run. The alkali metal content is preferably 0.1 to 10 ppm. The upper limit is preferably 8 ppm, more preferably 5 ppm.

The wholly aromatic polyester carbonate of the present invention contains at least one alkali metal element selected from the group consisting of lithium, sodium and potassium.

The wholly aromatic polyester carbonate of the present invention has a total content of Mg, Ca, Ti, Cr, Mn, Fe, Co, Ni, Cu, Zn, Sn, Ge, Zr, Hf and Sb of 5 ppm or less.

The wholly aromatic polyester carbonate of the present invention has a reduced viscosity measured in a mixed solvent of phenol/1,1,2,2-tetrachloroethane (weight ratio of 60/40) at a concentration of 1.2 g/100 ml and 35° C. of 0.5 dl/g or more. When the reduced viscosity is lower than 0.5 dl/g, the heat resistance and toughness of the obtained polymer become unsatisfactory. The reduced viscosity of the wholly aromatic polyester carbonate is preferably 0.6 dl/g or more, more preferably 0.7 dl/g or more.

Preferably, the wholly aromatic polyester carbonate of the present invention has a temperature at the time of a 5% weight reduction measured in a nitrogen atmosphere at a temperature elevation rate of 20° C./min of 475° C. or more. When the temperature at the time of a 5% weight reduction measured in a nitrogen atmosphere at a temperature elevation rate of 20° C./min is lower than 475° C., the heat resistance of the polymer lowers disadvantageously. The temperature is more preferably 480° C. or more, more preferably 485° C. or more.

Preferably, the wholly aromatic polyester carbonate of the present invention contains not more than 100 gelled products per 10 g of the polymer.

The number of the gelled products in the present invention is obtained by dissolving 10 g of the polymer in 200 cc of chloroform at room temperature, filtering the resulting solution with a filter having a nominal pore size of 30 μm, fully washing with chloroform, drying, irradiating foreign matter adhered to the filter with black light (wavelength of 365 nm), counting foreign substances which emit fluorescence and subtracting the number of other foreign substances not derived from the polymer, such as protein and cotton yarn, from the count. When the number of gelled products is larger than 100 per 10 g, the polymer deteriorates in quality in terms of moldability and optical properties. The number of gelled products is preferably 80 or less per 10 g, more preferably 60 or less per 10 g.

Further, the wholly aromatic polyester carbonate of the present invention has an excellent color, preferably a yellow index (YI value) of 20 or less, more preferably a yellow index of 15 or less.

The wholly aromatic polyester carbonate of the present invention can be advantageously produced by the above process of the present invention.

An aromatic dicarboxylic acid diaryl ester is used in place of an aromatic dicarboxylic acid in the prior art for the production of the wholly aromatic polyester carbonate. However, as the aromatic dicarboxylic acid diaryl ester is generally synthesized using an alkali metal compound as a catalyst, it is extremely difficult to obtain the wholly aromatic polyester carbonate having a low alkali metal content of the present invention by the prior art process. In the present invention, as described above, the aromatic dicarboxylic acid (a) represented by the following formula (III) is used:

HOOC-A$^1$-COOH     (III)

wherein $A^1$ is as defined in the above formula (I).

Examples of the aromatic dicarboxylic acid (a) include terephthalic acid, isophthalic acid, methylterephthalic acid, methylisophthalic acid, naphthalene-2,6-dicarboxylic acid, naphthalene-2,7-dicarboxylic acid, diphenyldicarboxylic acid, diphenylether dicarboxylic acid and diphenylsulfonedicarboxylic acid. These aromatic dicarboxylic acids may be used alone or in combination. It is particularly preferred to use a combination of terephthalic acid and isophthalic acid in order to obtain an excellent non-crystalline polymer.

The aromatic diol (b) used in the process of the present invention is represented by the following formula (IV):

HO-A$^2$-X-A$^3$-OH     (IV)

wherein $A^2$, $A^3$ and X are as defined in the above formula (I).

Examples of the aromatic diol (b) include 2,2-bis(4-hydroxyphenyl)propane, 1,1-bis(4-hydroxyphenyl)cyclohexane, 1,1-bis(4-hydroxyphenyl)-3,3,5-trimethylcyclohexane, 2,2-bis(3,5-dimethyl-4-hydroxyphenyl)propane and 2-(4-hydroxyphenyl)-2-(3,5-dichloro-4-hydroxyphenyl) propane. Out of these, 2,2-bis(4-hydroxyphenyl)propane and 1,1-bis(4-hydroxyphenyl)-3,3,5-trimethylcyclohexane are preferred. These aromatic diols may be used alone or in combination. When hydroquinone or 4,4'-dihydroxybiphenyl is used as another aromatic diol, it is preferably used in an amount of 1 to 15 mol % based on the total of the aromatic diols.

The diaryl carbonate (c) used in the process of the present invention is a compound represented by the following formula (IV):

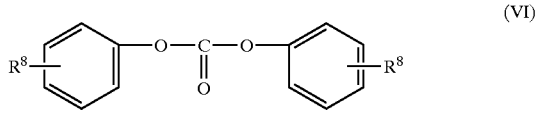

(VI)

wherein $R^8$'s are the same or different and each a hydrogen atom, halogen atom, hydroxyl group, carboxyl group, ester group or alkyl group having 1 to 6 carbon atoms.

Specific examples of $R^8$ in the above formula include a hydrogen atom; halogen atoms such as chlorine and fluorine; hydroxyl group; carboxyl group; ester groups having 1 to 6 carbon atoms such as methyl ester and ethyl ester; and alkyl groups having 1 to 6 carbon atoms such as methyl, ethyl and propyl.

Examples of the diaryl carbonate (c) include diphenyl carbonate, di-p-tolyl carbonate, di-p-chlorophenyl carbonate, phenyl-p-tolyl carbonate and dinaphthyl carbonate. Out of these, diphenyl carbonate is particularly preferred. These diaryl carbonates may be used alone or in combination.

The above aromatic dicarboxylic acid, aromatic diol and diaryl carbonate are preferably purified to a high level. Distillation or the like is used to purify them.

In the process of the present invention, the above compounds (a), (b) and (c) are used in a molar ratio which satisfies the following relational expressions (1) and (2) at the same time:

$$0.5 \leq A/B < 1.0 \quad (1)$$
$$0.9 \leq C/(A+B) \leq 1.1 \quad (2)$$

wherein A is the number of mols of the aromatic dicarboxylic acid (a), B is the number of mols of the aromatic diol (b) and C is the number of mols of the diaryl carbonate (c).

The above expression (1) indicates the molar ratio of the aromatic dicarboxylic acid (a) to the aromatic diol (b). By satisfying the above expression (1), the wholly aromatic polyester carbonate of the present invention can be advantageously produced.

The relationship of the above expression (1) is more preferably replaced by the following expression (1)-1:

$$0.7 \leq A/B < 1.0 \quad (1)-1.$$

The above expression (2) indicates the molar ratio of the diaryl carbonate (c) to the total of the aromatic dicarboxylic acid (a) and the aromatic diol (b).

When this ratio C/(A+B) is smaller than 0.9, the polymerization of the formed polymer may slow down and when the ratio is larger than 1.1, the coloring of the polymer becomes marked disadvantageously. The above expression (2) is more preferably $0.95 \leq C/(A+B) \leq 1.05$, particularly preferably $0.97 \leq C/(A+B) \leq 1.03$.

The process of the present invention is carried out by reacting the above compounds (a), (b) and (c) in the presence of the compound represented by the above formula (V).

In the above formula (V), $R^5$ and $R^6$ are each independently a hydrogen atom, alkyl group having 1 to 6 carbon atoms, cycloalkyl group having 5 to 10 carbon atoms, aryl group having 6 to 12 carbon atoms or aralkyl group having 7 to 12 carbon atoms, or $R^5$ and $R^6$ are bonded together to form a 5- to 7-membered heterocyclic group together with a nitrogen atom bonded thereto, $R^7$ is an alkyl group having 1 to 6 carbon atoms, cycloalkyl group having 5 to 10 carbon atoms, aryl group having 6 to 12 carbon atoms or aralkyl group having 7 to 12 carbon atoms, and n is an integer of 0 to 4.

Examples of the pyridine-based compound represented by the formula (V) include 4-aminopyridine, 4-dimethylaminopyridine, 4-diethy laminopyridine, 4-pyrrolidinopyridine, 4-piperidinopyridine, 4-pyrrolinopyridine and 2-methyl-4-dimethylaminopyridine. Out of these, 4-dimethylaminopyridine and 4-pyrrolidinopyridine are particularly preferred.

In the initial stage of this reaction, mainly the diaryl carbonate (c) reacts with the aromatic dicarboxylic acid (a) and the aromatic diol (b) to form a phenol. Since the aromatic dicarboxylic acid generally has low solubility, a high temperature is required to start the initial stage of the reaction and it takes long to complete the initial stage of the reaction. However, when the above specific pyridine-based compound is used, unexpectedly, the phenol is formed in this initial stage at an extremely low temperature in a short period of time. Surprisingly, this specific pyridine compound serves as an ester exchange catalyst in the latter stage of the production of the wholly aromatic polyester carbonate, thereby making it possible to obtain a polymer having a high degree of polymerization without using a conventionally known ester exchange catalyst containing a metal element in a short period of time. Meanwhile, when only the specific pyridine compound is used to carry out polymerization in the production process of a wholly aromatic polyester, the degree of polymerization does not increase in the latter stage of polymerization, thereby making it impossible to obtain a polymer having a high degree of polymerization. To obtain a polymer having a high degree of polymerization, a conventionally known ester exchange catalyst containing a metal element is used. When this catalyst containing a metal element is used, a wholly aromatic polyester carbonate having a low total content of alkali metal elements, alkali earth metal elements and other metal elements cannot be obtained.

The amount of the above pyridine-based compound may be a so-called catalytic amount but it is preferably 0.00001 to 0.05 mol, more preferably 0.0001 to 0.005 mol based on 1 mol of the above component (a).

In the process of the present invention, the polymerization temperature for thermopolymerization in the presence of the above pyridine-based compound is suitably 200 to 400° C. The term "polymerization temperature" means the temperature of a reaction system in the latter stage or at the end of polymerization. When the polymerization temperature is lower than 200° C., the melt viscosity of the polymer becomes high, thereby making it impossible to obtain a polymer having a high degree of polymerization. When the temperature is higher than 400° C., the deterioration of the polymer readily occurs disadvantageously.

In the process of the present invention, the polymerization reaction temperature is set to a relatively low level in the initial stage and gradually increased to the above polymerization temperature in the end. The polymerization temperature in the initial stage of the polymerization reaction is preferably 160 to 380° C.

The polymerization reaction is carried out under normal pressure or reduced pressure. It is preferred that the pressure should be normal in the initial stage of the polymerization reaction and then gradually reduced. At the time of normal pressure, the reaction system is preferably under an inert gas atmosphere such as nitrogen or argon. The polymerization reaction time is not particularly limited but it is about 0.2 to 10 hours.

For the production of a wholly aromatic polyester carbonate having a small number of gelled products of the present invention, the reaction is always carried out under reduced pressure from the start of the reaction or right after the start of the reaction. The reaction pressure is preferably 66.6 kPa (500 mmHg) or less, particularly preferably 46.7 kPa (350 mmHg) or less. The reaction temperature at this point is preferably 160° C. or more and less than 380° C. In the production process of the present invention, the temperature is preferably set to a relatively low level in the initial stage of the polymerization reaction and then gradually increased to the desired temperature in the end to complete the polymerization reaction. In the present invention, the initial stage of the polymerization reaction is that the polymerization reaction is carried out at 240° C. or less. Not particularly limited, the reaction system is preferably under an inert gas atmosphere such as nitrogen, argon or carbonic dioxide gas. The polymerization reaction time is not particularly limited but it is approximately 1 to 10 hours.

Stated more specifically, in the initial stage of the polymerization reaction, a phenol and carbonic dioxide gas are formed by a reaction between the dicarboxylic acid component (a) and the diaryl carbonate component (c) simultaneously with the polymerization reaction. Preferably, the temperature is set to a relatively low level in the initial stage of the polymerization reaction and then gradually increased to the desired final ultimate temperature in the end. The reaction temperature in the initial stage of the polymerization reaction is preferably 160 to 240° C. When the reaction temperature is lower than 160° C., the reaction rate becomes unsatisfactory. When the reaction temperature is higher than 240° C., unreacted raw materials may be distilled out to the outside of the reactor, thereby making it difficult to obtain a polymer having desired composition. The reaction temperature in the initial stage of the polymerization reaction is more preferably 170 to 240° C., particularly preferably 180 to 240° C. The initial stage of the polymerization reaction is carried out under reduced pressure, preferably as low pressure as possible that does not interfere with polymerization. Specifically, the pressure is preferably 66.6 kPa (500 mmHg) or less, particularly preferably 46.7 kPa (350 mmHg) or less. Preferably, the pressure is further reduced in limits that the raw materials do not flow out during the reaction. When the reaction is carried out under normal pressure, the number of gelled foreign substances contained in the obtained polymer becomes large, resulting in reduced quality. Further, the esterification rate of the dicarboxylic acid component (a) is preferably 60% or more at the end of the initial stage of the polymerization reaction. When the esterification rate is lower than 60%, the obtained polymer has low heat resistance with the result that the polymer may contain a large number of gelled foreign substances disadvantageously. The esterification rate is more preferably 70% or more, particularly preferably 75% or more.

The final ultimate temperature of the polymerization reaction is preferably 270° C. to 400° C. When the final ultimate temperature is lower than 270° C., the viscosity of the polymer becomes high, thereby making it difficult to obtain a polymer having a high degree of polymerization. When the final ultimate temperature is higher than 400° C., the deterioration of the polymer readily occurs disadvantageously. The final ultimate temperature is more preferably 280° C. to 380° C.

In the process of the present invention, the above components (a), (b) and (c) are preferably charged together into the reactor from the beginning of the reaction. The molar equivalent of the diaryl carbonate may be divided into several parts and introduced into the reactor several times from the start of the reaction.

Preferably, after the end of the polymerization reaction, the reaction product is taken out from the reactor, additives are kneaded with the product in a molten state, and the resulting product is pelletized. Although the product is generally cooled with water or the like for pelletization, water having a low alkali metal content such as ion exchange water is preferably used in the present invention.

The wholly aromatic polyester carbonate of the present invention can be obtained by the above-described process.

The wholly aromatic polyester carbonate obtained by the above process of the present invention is non-crystalline in most cases and a transparent molded article can be obtained by the melt molding such as injection molding of this wholly aromatic polyester carbonate. The non-crystallinity of the polymer can be confirmed from a phenomenon that its melting point cannot be obtained by DSC, for example.

Additives such as a stabilizer, colorant, pigment and lubricant may be optionally added to the above wholly aromatic polyester carbonate during or after the production of the wholly aromatic polyester carbonate. Out of these, additives which do not contain alkali metal elements such as Mg, Ca, Ti, Cr, Mn, Fe, Co, Ni, Cu, Zn, Sn, Ge, Zr, Hf and Sb are preferably used in the present invention.

EXAMPLES

The following examples and comparative examples are provided for the purpose of further illustrating the present invention but are in no way to be taken as limiting. "Parts" in the examples means "parts by weight" unless otherwise stated. The reduced viscosity ($\eta_{sp}/C$) is a value measured in a mixed solvent of phenol/1,1,2,2-tetrachloroethane (weight ratio of 60/40) at a concentration of 1.2 g/100 ml and a temperature of 35° C. and the glass transition temperature (Tg) of the polymer is a value measured by DSC (Model 2920 of TA Instruments Co., Ltd.) at a temperature elevation rate of 10° C./min. The 5% weight reduction temperature of the polymer is a value measured by a thermogravimetric analyzer TGA (Model 2950 of TA Instruments Co., Ltd.) under a nitrogen atmosphere at a temperature elevation rate of 20° C./min. The alkali metal and the like metal content of the polymer was measured by an ICP emission analyzer (IRIS-AP of Nippon Jerrel Ash Co., Ltd.) after several grams (1 to 10 g) of a sample was ashed and dissolved in diluted nitric acid.

The obtained polymer was injection molded at 340° C. to form a 2 mm-thick plate. The yellow index (YI value) of the polymer was obtained by measuring the 2 mm-thick plate using the UV-2400PC of Shimadzu Corporation.

The content of the recurring unit represented by the formula (II) was calculated from the charge ratio by confirming that no sublimate was formed. The amount of each terminal group of the obtained polymer was measured by $^1$H-NMR using chloroform deuteride as a solvent to calculate the proportion of the terminal hydroxyl group. The number of gelled products was obtained by dissolving 10 g of the polymer in 200 cc of chloroform, filtering the solution with a filter having a nominal pore size of 30 µm, fully washing with chloroform, drying and counting gelled products (which emitted fluorescence with black light having a wavelength of 365 nm, excluding other foreign substances not derived from the polymer, such as protein and cotton yarn) adhered to the surface of the filter.

Example 1

46.5 parts of terephthalic acid, 19.9 parts of isophthalic acid, 100.3 parts of 2,2-bis(4-hydroxyphenyl)propane (to be referred to as "bisphenol A" hereinafter), 179.8 parts of diphenyl carbonate and 0.049 part of 4-dimethylaminopyridine were charged into a stainless steel reactor having a vacuum distillation system equipped with a stirrer and nitrogen introduction port and a reaction was started at 200° C. and 40.0 kPa (300 mmHg). That is, at this point, the A/B value of the expression (1) was 0.91 and the C/(A+B) value of the expression (2) was 1.0. After 1 hour, the temperature was raised to 220° C., this temperature rise was confirmed and then the pressure was adjusted to 26.7 kPa (200 mmHg). 3 hours after the start of the reaction, it was confirmed that the raw materials were uniformly dissolved.

Thereafter, the temperature was further raised and the pressure was further reduced, and 5 hours after the start of the reaction, the final ultimate temperature and pressure in the system were adjusted to 320° C. and 40 Pa (0.3 mmHg). Under the same conditions, polymerization was carried out for 1 hour to obtain a non-crystalline wholly aromatic polyester carbonate.

A sublimate was rarely formed then. The obtained polymer was light yellow and transparent and had a 5% weight reduction temperature of 488° C. The polymer had a reduced viscosity of 0.88 dl/g, a glass transition temperature of 194° C. and a total content of lithium, sodium and potassium of 0.99 ppm. The polymer had a content of the unit represented by the formula (II) of 9.1 mol %, a YI value of 10.3 and a terminal hydroxyl group content of 52 mol % and contained 8 gels per 10 g.

Example 2

A reaction was carried out in the same manner as in Example 1 except that the amount of 2,2-bis(4-hydroxyphenyl)propane (so-called bisphenol A) was changed from 100.3 parts to 109.4 parts and the amount of diphenyl carbonate was changed from 179.8 parts to 188.3 parts to obtain a non-crystalline wholly aromatic polyester carbonate. The A/B value of the above expression (1) was 0.83 and the C/(A+B) value of the above expression (2) was 1.0.

A sublimate was rarely formed. The obtained polymer was light yellow and transparent and had a 5% weight reduction temperature of 487° C. The polymer had a reduced viscosity of 0.84, a glass transition temperature of 188° C. and a total content of lithium, sodium and potassium of 0.81 ppm.

The polymer had a content of the unit represented by the formula (II) of 16.7 mol %, a YI value of 7.4 and a terminal hydroxyl group content of 48 mol % and contained 12 gels per 10 g.

Example 3

A reaction was carried out in the same manner as in Example 1 except that the amount of terephthalic acid was changed from 46.5 parts to 63.1 parts and the amount of isophthalic acid was changed from 19.9 parts to 3.3 parts to obtain a non-crystalline wholly aromatic polyester carbonate. The A/B value of the above expression (1) was 0.91 and the C/(A+B) value of the above expression (2) was 1.0.

A sublimate was rarely formed. The obtained polymer was light yellow and transparent and had a 5% weight reduction temperature of 498° C. The polymer had a reduced viscosity of 0.69, a glass transition temperature of 190° C. and a total content of lithium, sodium and potassium of 0.94 ppm.

The polymer had a content of the unit represented by the formula (II) of 9.1 mol %, a YI value of 9.8 and a terminal hydroxyl group content of 57 mol % and contained 10 gels per 10 g.

Example 4

A reaction was carried out in the same manner as in Example 1 except that 33.2 parts of terephthalic acid and 43.2 parts of naphthalene 2,6-dicarboxylic acid were used in place of 46.5 parts of terephthalic acid and 19.9 parts of isophthalic acid to obtain a non-crystalline wholly aromatic polyester carbonate. The A/B value of the above expression (1) was 0.91 and the C/(A+B) value of the above expression (2) was 1.0.

A sublimate was rarely formed. The obtained polymer was light yellow and transparent and had a 5% weight reduction temperature of 495° C. The polymer had a reduced viscosity of 0.82, a glass transition temperature of 205° C. and a total content of lithium, sodium and potassium of 1.2 ppm.

The polymer had a content of the unit represented by the formula (II) of 9.1 mol %, a YI value of 19.5 and a terminal hydroxyl group content of 49 mol % and contained 18 gels per 10 g.

Example 5

A reaction was carried out in the same manner as in Example 1 except that the amount of 2,2-bis(4-hydroxyphenyl)propane (so-called bisphenol A) was changed from 100.3 parts to 94.1 parts and the amount of diphenyl carbonate was changed from 179.8 parts of 173.9 parts to obtain a non-crystalline wholly aromatic polyester carbonate. The A/B value of the above expression (1) was 0.97 and the C/(A+B) value of the above expression (2) was 1.0.

A sublimate was rarely formed. The obtained polymer was light yellow and transparent and had a content of the unit represented by the formula (II) of 2.9 mol %, a YI value of 13.5, a terminal hydroxyl group content of 58 mol %, a reduced viscosity of 0.76 dl/g and a glass transition temperature of 192° C.

Further, this polymer had a total content of lithium, sodium and potassium of 1.04 ppm and a 5% weight reduction temperature of 487° C. and contained 9 gels per 10 g.

Example 6

A reaction was carried out in the same manner as in Example 1 except that the amount of terephthalic acid was changed from 46.5 parts to 58.15 parts, the amount of isophthalic acid was changed from 19.9 parts to 24.92 parts, the amount of bisphenol A was changed from 100.3 parts to 125.56 parts, the amount of diphenyl carbonate was changed from 179.8 parts to 224.93 parts and the amount of 4-dimethylaminopyridine was changed from 0.049 part to 0.061 part to obtain a non-crystalline wholly aromatic polyester carbonate. The A/B value of the above expression (1) was 0.91 and the C/(A+B) value of the above expression (2) was 1.0.

A sublimate was rarely formed. The obtained polymer was achromatic with a slight yellow tint and transparent and had a reduced viscosity of 0.74 dl/g.

The polymer had a glass transition temperature of 194° C., a total content of lithium, sodium and potassium of 1.01 ppm, a 5% weight reduction temperature of 487° C., a YI value of 10.2 and a terminal hydroxyl group content of 51 mol % and contained 4 gels per g.

Comparative Example 1

The wholly aromatic polyester (U-100) of Unitika Co., Ltd. manufactured by the interfacial polymerization process had a reduced viscosity of 0.83 dl/g. This polymer had a glass transition temperature of 194° C., contents of lithium, sodium and potassium of 0.01 ppm or less, 20 ppm and 0.16 ppm, respectively, a 5% weight reduction temperature of 476° C. and a YI value of 10.5 and contained 205 gels per g.

The physical properties of Examples 1 to 6 and Comparative Example 1 are shown in Table 1 and Table 2.

TABLE 1

|  | (II)/((I) + (II)) (mol %) | ηsp/C (dL/g) | Tg(° C.) | 5% weight reduction temperature (° C.) | YI | molar ratio of terminal hydroxyl group to the total of all terminal groups (mol %) | number of gels (per 10 g) |
|---|---|---|---|---|---|---|---|
| Ex.1 | 9.1 | 0.88 | 194 | 488 | 10.3 | 52 | 8 |
| Ex.2 | 16.7 | 0.84 | 188 | 487 | 7.4 | 48 | 12 |
| Ex.3 | 9.1 | 0.69 | 190 | 498 | 9.8 | 57 | 10 |
| Ex.4 | 9.1 | 0.82 | 205 | 495 | 19.5 | 49 | 18 |
| Ex.5 | 2.9 | 0.76 | 192 | 487 | 13.5 | 58 | 9 |
| Ex.6 | 9.1 | 0.74 | 194 | 487 | 10.2 | 51 | 4 |
| C.Ex.1 | 0 | 0.83 | 194 | 476 | 10.5 | not measured | 205 |

Ex.: Example
C.Ex.: Comparative Example

TABLE 2

|  | total content of lithium, sodium and potassium (ppm) | total content of Mg, Ca, Ti, Cr, Mn, Fe, Co, Ni, Cu, Zn, Ge, Zr, Sn, Sb and Hf (ppm) |
|---|---|---|
| Ex.1 | 0.99 | <1.5 |
| Ex.2 | 0.81 | <1.5 |
| Ex.3 | 0.94 | <1.5 |
| Ex.4 | 1.2 | <1.5 |
| Ex.5 | 1.04 | <1.5 |
| Ex.6 | 1.01 | <1.5 |
| C.Ex.1 | 20.2 | 117 ppm of Ca, total content of other metals of less than 4.0 ppm |

Ex.: Example
C.Ex.: Comparative Example

What is claimed is:

1. A wholly aromatic polyester carbonate comprising a group represented by the following formula (I):

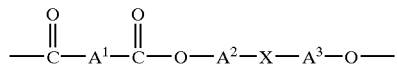
(I)

wherein $A^1$ is a substituted or unsubstituted aromatic group, $A^2$ and $A^3$ are the same or different and each a substituted or unsubstituted benzene ring group, and X is a group selected from the group consisting of a group represented by the following formula:

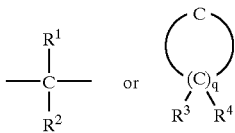

wherein $R^1$, $R^2$, $R^3$ and $R^4$ are each independently a hydrogen atom, halogen atom, alkyl group having 1 to 6 carbon atoms, cycloalkyl group having 5 or 6 carbon atoms, aryl group having 6 to 12 carbon atoms or aralkyl group having 7 to 12 carbon atoms, and q is an integer of 4 to 10, with the proviso that $R^3$'s and $R^4$'s may be the same or different, and a group represented by the following formula:

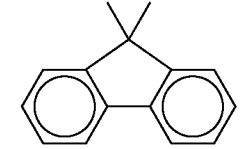

and a group represented by the following formula (II):

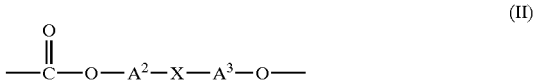
(II)

wherein $A^2$, $A^3$ and X are as defined hereinabove,
as the main recurring units, the group represented by above formula (II) contained in an amount of 0.5 to 49 mol % based on the total of the group represented by the above formula (I) and the group represented by above formula (II), and having an alkali metal element content of 10 ppm or less, and having a reduced viscosity measured in a mixed solvent of phenol and 1,1,2,2-tetrachloroethane (weight ratio of 60/40) at a concentration of 1.2 g/100 ml and 35° C. of 0.5 dl/g or more.

2. The wholly aromatic polyester carbonate of claim 1 which has an alkali metal element content of 0.1 to 10 ppm.

3. The wholly aromatic polyester carbonate of claim 1 which contains at least one alkali metal element selected from the group consisting of lithium, sodium and potassium.

4. The wholly aromatic polyester carbonate of claim 1 which has a total content of Mg, Ca, Ti, Cr, Mn, Fe, Co, Ni, Cu, Zn, Sn, Ge, Zr, Hf and Sb of 5 ppm or less.

5. The wholly aromatic polyester carbonate of claim 1 which comprises the group represented by the above formula (II) in an amount of 2.9 to 31 mol % based on the total of the group represented by the above formula (I) and the group represented by the above formula (II).

6. The wholly aromatic polyester carbonate of claim 1 which has a terminal hydroxyl group, terminal carboxyl group and terminal aryl group and contains the terminal hydroxyl group in an amount of 90 mol % or less based on the total of the three terminal groups.

7. The wholly aromatic polyester carbonate of claim 1 or 4 which contains at most 100 gelled products per 10 g of the polymer.

8. The wholly aromatic polyester carbonate of claim 1 or 4 which has a yellow index (YI) value of 20 or less.

9. The wholly aromatic polyester carbonate of claim 1 which has a 5% weight reduction temperature measured under a nitrogen atmosphere at a temperature elevation rate of 20° C./min of 475° C. or more.

10. A process for producing a wholly aromatic polyester carbonate, comprising the step of reacting an aromatic dicarboxylic acid represented by the following formula (III):

$$HOOC-A^1-COOH \quad (III)$$

wherein $A^1$ is a substituted or unsubstituted aromatic group, and an aromatic diol represented by the following formula (IV):

$$HO-A^2-X-A^3-OH \quad (IV)$$

wherein $A^2$ and $A^3$ are the same or different and each a substituted or unsubstituted benzene ring group, and X is a group selected from the group consisting of a group represented by the following formula:

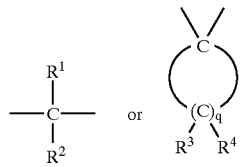

wherein $R^1$, $R^2$, $R^3$ and $R^4$ are each independently a hydrogen atom, halogen atom, alkyl group having 1 to 6 carbon atoms, cycloalkyl group having 5 or 6 carbon atoms, aryl group having 6 to 12 carbon atoms or aralkyl group having 7 to 12 carbon atoms, and q is an integer of 4 to 10, with the proviso that $R^3$'s and $R^4$'s may be the same or different, and a group represented by the following formula:

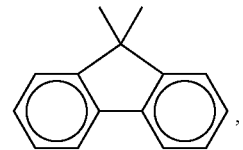

and a diaryl carbonate in a ratio which satisfies the following expressions (1) and (2):

$$0.5 \leq A/B < 1.0 \quad (1)$$

$$0.9 \leq C/(A+B) \leq 1.1 \quad (2)$$

wherein A is the number of mols of the aromatic dicarboxylic acid, B is the number of mols of the aromatic diol and C is the number of mols of the diaryl carbonate, in the presence of a compound represented by the following formula (V):

wherein $R^5$ and $R^6$ are each independently a hydrogen atom, alkyl group having 1 to 6 carbon atoms, cycloalkyl group having 5 to 10 carbon atoms, aryl group having 6 to 12 carbon atoms or aralkyl group having 7 to 12 carbon atoms, or $R^5$ and $R^6$ are bonded together to form a 5- to 7-membered heterocyclic group together with the nitrogen atom bonded thereto, $R^7$ is an alkyl group having 1 to 6 carbon atoms, cycloalkyl group having 5 to 10 carbon atoms, aryl group having 6 to 12 carbon atoms or aralkyl group having 7 to 12 carbon atoms, and n is an integer of 0 to 4, to produce the wholly aromatic polyester carbonate of claim 1 or 4.

11. The process of claim 10, wherein the above formula (1) is the following formula (1)-1:

$$0.7 \leq A/B < 1.0 \quad (1)\text{-}1.$$

* * * * *